M. A. MAZADE.
JOINT FOR FIXING ELASTIC TUBES UPON METAL PIPES.
APPLICATION FILED OCT. 28, 1916.
1,271,597.
Patented July 9, 1918.
2 SHEETS—SHEET 1.
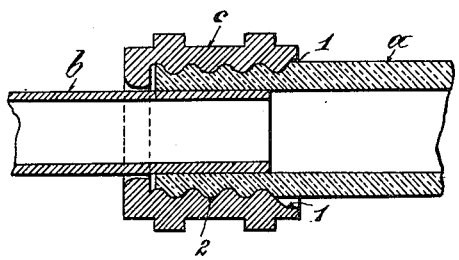
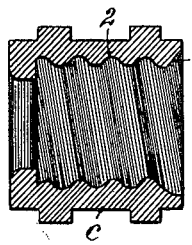 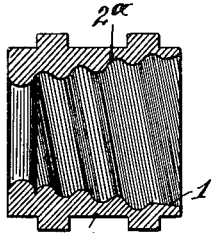 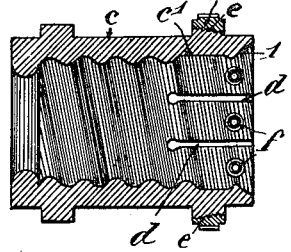
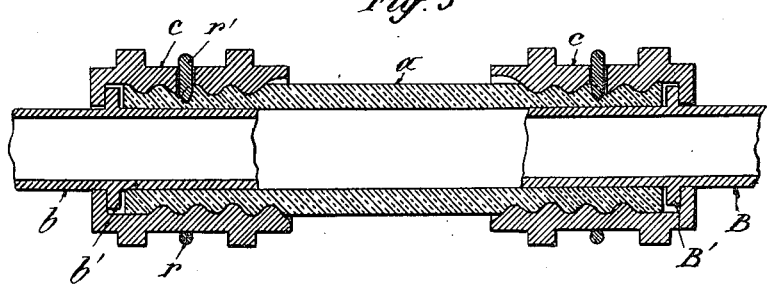
Inventor
Maurice Alexandre Mazade
by Otto Munk
his Attorney M. A. MAZADE.
JOINT FOR FIXING ELASTIC TUBES UPON METAL PIPES.
APPLICATION FILED OCT. 28, 1916.
1,271,597. Patented July 9, 1918.
2 SHEETS—SHEET 2.
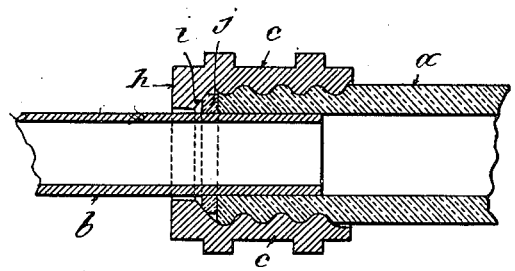
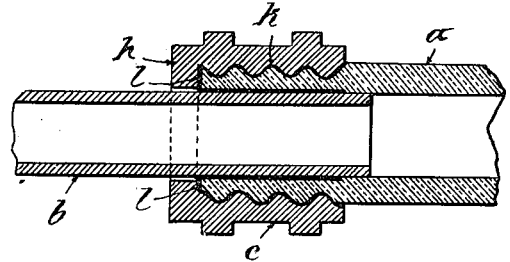
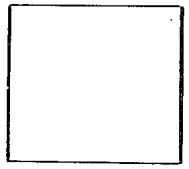 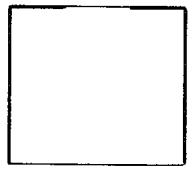 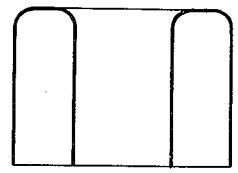

UNITED STATES PATENT OFFICE.

MAURICE ALEXANDRE MAZADE, OF PARIS, FRANCE.

JOINT FOR FIXING ELASTIC TUBES UPON METAL PIPES.

1,271,597.   Specification of Letters Patent.   Patented July 9, 1918.

Application filed October 28, 1916. Serial No. 128,163.

*To all whom it may concern:*

Be it known that I, MAURICE ALEXANDRE MAZADE, citizen of the Republic of France, residing at 15 Rue du Débarcadère, Paris, in the Republic of France, have invented new and useful Improvements in Joints for Fixing Elastic Tubes Upon Metal Pipes, of which the following is a specification.

The object of this invention is a tight joint system for attaching tubes made of rubber or other elastic material upon pipes or nozzles in metal or other hard substance, which system consists essentially in the use of a coupler nut with rounded screw threads having on one side a conical entry, and which is first slipped freely upon the metal tube or nozzle and is then screwed upon the rubber tube so as to compress it by means of the screw threads in order to press it strongly upon the metal tube or nozzle and thus produce a tight joint.

The threaded portion of the coupler nut can be cylindric or conic, and the end of the rubber tube upon which the nut is screwed may be smooth or molded with a rounded thread having a larger diameter than that of the nut thread, so that a compression of the elastic substance will always take place when the nut is screwed on.

The nut device can be completed by a safety device which prevents all unscrewing or uncoupling of the system. To increase the tightness of the joint, the inner side of the coupler nut can be shaped so as to present a conically hollowed portion, and between this side and the end of the rubber tube is inserted a washer of rubber or any other compressible substance so that when the nut is screwed up, the washer will be pressed against the joint of the two tubes which are to be assembled. Lastly, it may be stated that by inserting between the coupler nut and the rubber tube a thin sheet of metal or other flexible substance, the rubber will be prevented from adhering to the nut or coupler and thus making it difficult to remove such coupler; this sheet or film can take the form of a cap which is pressed into such a shape as to prevent any direct contact between the rubber and the metal tubes.

In the accompanying drawings, which are purely of an illustrative nature:

Figure 1 shows an example of the method of carrying out this invention, with the coupling nut in place.

Figs. 2 and 3 show sectional views of two methods of making the coupling nut whose threaded surfaces are respectively cylindric and conic.

Fig. 4 shows a form of coupling nut which is provided with a nut-locking device.

Fig. 5 shows the coupling nut provided with another design of nut-locking device and applied to liquid or gas pipes.

Fig. 6 is a sectional view of the tight joint coupler having the supplementary joint-tightening device above mentioned.

Fig. 7 shows a sectional view of a coupling which is provided with the film of sheet metal designed to prevent the rubber tube from adhering to the coupler.

Figs. 8, 9 and 10 show the different forms which may be given to this film or sheet.

Referring to Fig. 1, it is desired to produce a tight fitting of a tube $a$ of rubber or other flexible substance upon a tube $b$ of metal or other hard material. This tight fit is produced by the coupler or metal nut $c$ which slips freely upon the tube $b$ and has a conically flaring entrance portion 1 and a screw thread with rounded threads 2 which sink into the elastic substance of the tube $a$ when the screwing takes place and thus press this substance strongly upon the central tube $b$ so as to form a tight joint.

Fig. 2 shows a section of the same coupler before putting in place.

Fig. 3 shows a similar coupler in which the screw thread $2^a$ instead of being formed upon a cylindrical surface is now formed upon a conical surface, and this method facilitates the screwing of the coupler.

In Fig. 4 is observed a coupler made according to the present invention, the coupler nut carrying an extension in the shape of a non-threaded portion $c^1$ provided with longitudinal slots or saw cuts $d$ and having on the outer part a conical screw thread $e$; each of the segments thus produced by the slots carries on the inside a conical projection $f$, and at the end of the coupler there is again employed the conical entrance portion 1. After having screwed the coupler in place, if there is screwed an ordinary conic nut $g$ upon the conically threaded portion $e$ this will produce an elastic pressure of the segments of the non-threaded portion $c^1$ upon the rubber tube and at the same time the points $f$ press into the elastic substance so that it will be impossible for any accidental uncoupling of the device to take place.

Fig. 5 represents piping for liquids or gas, with the two sections $b$ and $B$ joined by a rubber sleeve $a$ the tight assemblage being carried out by means of the two couplers $c$ according to the present invention. These couplers are combined here with a safety device which assures an absolutely fast holding and prevents any uncoupling. Each of the metal tubes is provided with a flange $b^1$ or $B^1$ which prevents all slipping of the corresponding tubes; the screw threads of the couplers prevent any slipping of the rubber, and a spring collar $r$ prevents all unscrewing of the coupler; this spring collar is provided at one of its ends with a point $r^1$ directed toward the center, and when the collar is in position the point passes through a hole in the material of the coupler and penetrates into the substance of the rubber sleeve which can be provided if need be with a depression for this purpose.

In Fig. 6 is shown an arrangement which can be adopted in order to increase the tightness of the coupling. This method consists in cutting out the inner side $h$ of the coupler $c$ so that it will possess a conical hollowed portion $i$ and between the coupler and the rubber tube $a$ is inserted a washer $j$ of rubber or any other compressible substance so that upon screwing up the coupler $c$, the washer $j$ will be pressed against the joint between the tube $a$ and the metal tube $b$ so as to increase the tightness of this joint.

In order to prevent any direct contact between the coupler $c$ and the rubber tube, the method shown in Fig. 7 can be employed in which a film or sheet $k$ of metal or any other deformable substance is used between the coupler $c$ and the rubber tube $a$.

As shown in Fig. 8, this film or sheet may take the form of a cylinder whose diameter is the same as the outside diameter of the rubber tube. It can also have the shape of a pressed or stamped cap, as shown in Fig. 9, so as to prevent all direct contact between the edge $h$ of the coupler and the end $l$ of the rubber tube, or again it can have the form of the pressed or stamped cap represented in Fig. 5. In this latter case, it will be observed in Fig. 7 that that portion of the rubber tube $a$ which is compressed between the parts $b$ and $c$ does not come in contact with the coupler $c$ nor the metal tube $b$. The interposition of the film or sheet prevents the rubber tube from adhering to the metal tube or the coupler and thus allows the whole to be readily taken apart.

The couplers made according to the present invention with or without safety devices can be applied to piping of all kinds for circulation of gas or liquids in all classes of machines, internal combustion engines for automobiles, or aviation, as well as for all kinds of pipings.

It is understood that the above described devices are only given as typical examples and that without departing from the spirit of the invention these devices can be modified as concerns their forms, material, dimensions and details of construction. It is to be especially remarked that the screw threads on the interior of the coupler can be single or multiple. With a coupler having a conically shaped interior, these screw threads which are either sunken or raised in relief upon the cone, may run through the whole length of the cone or for a fraction of this length, and the male thread thus formed enlarges progressively at the expense of the female thread as the screw thread progresses to the apex of the cone.

Having now described my invention, what I claim as new and desire to secure by Letters Patent is:

1. In a joint for tubing, the combination with a rigid tube, of a flexible tube telescoping therewith, a threaded nut engaging said flexible tube and adapted to tightly clamp the same to the rigid tube, and deformable material interposed between the rigid tube and the flexible tube and between the latter and the nut.

2. In a joint for tubing, the combination with a rigid tube, of a flexible tube telescoping therewith, a cap of flexible metal over the end of the flexible tube which telescopes with the rigid tube, a portion of the metal of said cap being interposed between the rigid tube and the flexible tube and a threaded nut for clamping said flexible tube to said rigid tube.

In testimony whereof I have signed my name to this specification in the presence of two subscribing witnesses.

MAURICE ALEXANDRE MAZADE.

Witnesses:
   Louis Moses,
   Chas. P. Pressly.